United States Patent [19]

Clement

[11] 4,456,411
[45] Jun. 26, 1984

[54] TWIST DRILL
[76] Inventor: Burke Clement, 7823 Gleason Rd., Westview Towers, Apt. 1214, Knoxville, Tenn. 37919
[21] Appl. No.: 524,834
[22] Filed: Aug. 19, 1983

Related U.S. Application Data

[63] Continuation-in-part of Ser. No. 291,640, Aug. 10, 1981, Pat. No. 4,400,119.

[51] Int. Cl.³ .............................................. B23B 51/02
[52] U.S. Cl. ..................................... 408/223; 408/230
[58] Field of Search ............... 408/230, 210, 213, 223, 408/715, 224

[56] References Cited

U.S. PATENT DOCUMENTS

| | | | |
|---|---|---|---|
| 390,672 | 10/1888 | Holmes | 408/230 |
| 472,541 | 4/1892 | Johnson | 408/230 |
| 542,223 | 7/1895 | Johnson | 408/230 |
| 3,824,026 | 7/1974 | Gaskins | 408/210 |
| 4,222,690 | 9/1980 | Hosoi | 408/230 |

FOREIGN PATENT DOCUMENTS

| | | | |
|---|---|---|---|
| 1062503 | 4/1954 | France | 408/230 |
| 340505 | 5/1936 | Italy | 408/230 |
| 1409 | 1/1895 | United Kingdom | 408/230 |
| 608745 | 9/1948 | United Kingdom | 408/230 |
| 1419624 | 12/1975 | United Kingdom | 408/230 |
| 286458 | 8/1971 | U.S.S.R. | 408/210 |

Primary Examiner—William R. Briggs
Attorney, Agent, or Firm—Pitts, Ruderman & Kesterson

[57] ABSTRACT

A twist drill (20) is provided which has an improved tip (26) including at least one spiral groove (42) which extends from the leading face of a cutting edge of a tip portion of the drill. This groove is positioned at a spaced location from the cutting lip (40) and extends to the trailing face of the cutting blade tip such that a portion of the material to be drilled initially passes through the spiral groove (42) during the drilling operation as the drill is fed into the work piece. The portion of the material which passes through the groove (42) is at least partially cut by a subsequent pass of the cutting edge of the further cutting blade tip and causes shavings of the material to be broken into smaller sizes thereby enhancing the travel of the shavings along the length of the flutes (70') and reducing the binding forces applied to the twist drill during drilling operations. The flutes (70') are also enlarged in accordance with a specified criteria to enhance the drilling efficiency.

5 Claims, 8 Drawing Figures

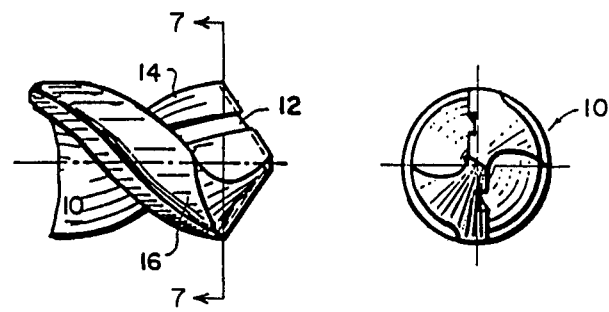
FIG.1A  FIG.1B
PRIOR ART
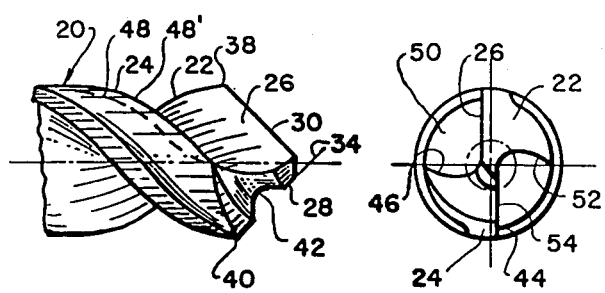
FIG.2  FIG.3
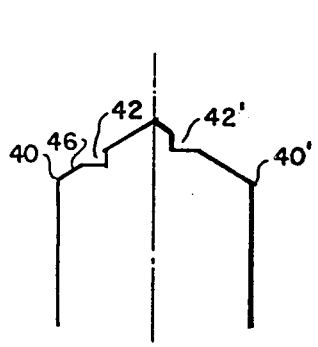 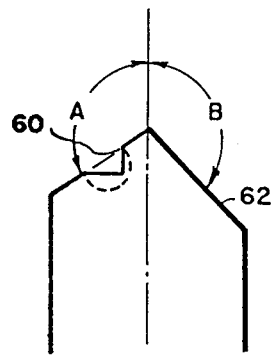 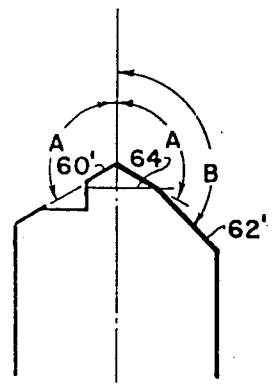
FIG.4  FIG.5  FIG.6

4,456,411

TWIST DRILL

This application is a continuation-in-part of application Ser. No. 291,640, filed on Aug. 10, 1981 now U.S. Pat. No. 4,400,119.

TECHNICAL FIELD

This invention relates to a twist drill which drills holes in a work piece into which the drill is fed and incorporates features which particularly adapt the drill for certain orthopedic surgery applications. In this invention, the drill includes a modified tip having at least one spiral groove which extends from the leading face to the trailing face of the tip portion of the cutting blades and enlarged flutes. These features synergistically assist in preventing the build up of heat within the material being drilled and enhance the efficiency of the drilling operation.

BACKGROUND ART

Various types of twist drills are known in the prior art. A listing of related prior art is delineated in the file history of the parent application to this case. However, the twist drills of known prior art suffer certain disadvantages. For example, twist drills tend to overheat during drilling operations which causes an expansion of the twist drill material resulting in additional binding forces being applied by the work piece against the cutting edges. This attenuates the speed which the twist drill can be fed into the work piece and also increases the wear on the drill itself.

Twist drills create shavings during the drilling operation which normally move from the tip to the shank of the drill through the flutes. The shaving sizes are related to the width of the leading cutting edge of the tip portion of the drill and can assume substantially large lengths with respect to the length of the drill. These shavings, particularly large shavings generated by certain twist drills, can become bound within the twist drill flutes between the margin or blade of the twist drill and the wall of the bore or hole in the work piece. Such bound shavings increase the work required to drill a hole and also reduce the useful life of the drill.

Therefore, it is an object of the present invention to provide an improved twist drill which has features which suit it for medical application and particularly for drilling bone as is required in certain orthopedic surgery procedures. Another object of the invention is to provide a twist drill which incorporates a modified tip having a groove which extends from the leading face to the trailing face of the tip portion of at least one of the cutting blades such that material being cut from the work piece initially passes through this groove prior to its being cut by the pass of the trailing cutting blade. In this connection, the shaving sizes are reduced and this feature can also be used to assist in equalizing the work done by the leading and trailing cutting blades.

This modified tip portion shaves the chips into narrow strips or chips which are received within a modified and enlarged operatively associated flute which serves to break the narrow strips into shorter lengths. The flute of the present invention is enlarged such that this greater flute cross-sectional area between the lands allows the chips moving through the flute to contact the wall of the work piece being drilled. This contact between the chips and the wall of the work piece serves to further break the chips up into smaller portions thereby enhancing the ability of the chips to move through the flutes. This feature reduces the friction between the twist drill and the work piece and thereby reduces the heat build up.

Still a further object of the present invention is to provide an improved twist drill in which the outer cutting edge of a portion of one of the blades forms an obtuse angle with the longitudinal axis of the drill which is greater than the angle formed by the further cutting edge of the further cutting blade.

DISCLOSURE OF THE INVENTION

Other objects and advantages will in part be obvious and will in part appear hereinafter and will be accomplished by the present invention which provides an improved twist drill. The twist drill of the present invention includes a modified tip having at least one spiral groove which extends from the leading face of each cutting edge of the tip portion of the drill. This groove is positioned at a spaced location from the cutting lip and extends to the trailing face of the cutting blade tip. The portion of the material to be drilled initially passes through the spiral groove during the drilling operation as the drill is fed into such material. A portion of the material which passes through the groove is at least partially cut by the subsequent pass of the cutting edge of the further cutting blade tip which causes shavings to be broken into smaller sizes than would normally be cut in the absence of such grooves. Moreover, the drill incorporates flutes defined between adjacent land or the walls thereof in which the wall of the trailing edge of the flute has a radius greater than the wall of the leading edge. This creates a flute having a greater cross-sectional area which allows the shavings or chips to break up even further by contacting the wall of the hole being drilled. The small shavings are thus broken which assists in reducing the binding forces applied to the twist drill during the drilling operation and also tends to reduce the heat generated during such operations.

In one embodiment, the slope of the leading cutting edge of the tip portion of one of the cutting blades forms a greater obtuse angle with the longitudinal axis of the twist drill than the slope of the leading cutting edge of the further cutting blade. The cutting edge forming the greater obtuse angle is the trailing edge and the cutting edge forming the lesser angle is the leading cutting edge which normally cuts shavings from the material of a work piece initially.

BRIEF DESCRIPTION OF THE DRAWINGS

The above-mentioned features will become more clearly understood when the following detailed description of the invention is read together with the drawings in which:

FIGS. 1A and 1B illustrate prior art twist drills.

FIG. 2 illustrates a twist drill constructed in accordance with various features of the present invention.

FIG. 3 illustrates an end view looking directly into the tip along an extended longitudinal axis of said twist drill.

FIG. 4 illustrates a traverse cross-sectional outline of a twist drill incorporating various features of the present invention and includes a pair of staggered grooves.

FIG. 5 illustrates a twist drill incorporating a single spherical groove on the tip portion of the drill and has a leading cutting edge which forms an obtuse angle with longitudinal axis of the twist drill which is less than the obtuse angle formed by the trailing edge and the longitudinal axis of the twist drill.

FIG. 6 illustrates a further embodiment of a twist drill in which the terminal tip portion of the drill is symmetric about the longitudinal axis of the drill and in which a portion of the trailing edge forms greater obtuse angle with the longitudinal axis of the twist drill than the leading edge.

BEST MODE FOR CARRYING OUT THE INVENTION

Figure 7:
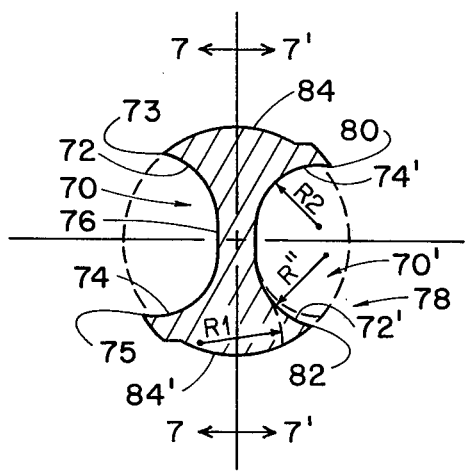
FIG. 7 depicts various features of the enlarged flute(s) which causes the size of the chips to be broken up by wall contact. The sectional portion of the FIG. 7 indicated by the 7—7 line is taken along the plane 7—7 in FIG. 1 for one-half of the drill. The sectional portion of FIG. 7 indicated by the 7'—7' line is taken along the same cutting plane but the improvement has been added. Note that this plane cuts through only one-half of the twist drill and the plane of the cut is perpendicular to the land and flute under investigation.

Referring now to the drawings, a prior art twist drill is indicated generally at 10 in FIGS. 1A and 1B. These figures illustrate the provision of a groove 12 which extends longitudinally along the length of the leading faces of the cutting blade 14 and 16. These grooves are designed to increase the contact points between the cutting blades and the work piece material.

A twist drill constructed in accordance with the various features of the present invention is illustrated in a partial elevation view in FIG. 2. This twist drill is generally referred to at 20 and includes a pair of spiral cutting blades 22 and 24. These spiral cutting blades commence at the shank (not shown) of the twist drill and continue until they are tapered down at the tip portion 26 of the twist drill. Each of the cutting blades 22 and 24 define a cutting edge 28 and 30, respectively on the leading face of the cutting blades at the tapered tip portion. These cutting edges extend from the central web 34, at the apex of the tip which joins the tapered leading face to the tapered trailing face of the respective annularly spaced blade, to the respective cutting lip 40 which defines the juncture at which the spiral cutting blades begin to be tapered to form the tip portion of the twist drill.

As illustrated in FIGS. 2 and 3, in this embodiment of the present invention, the tip of the drill is modified by a spiral groove generally indicated at 42 which extends from the leading face 44 of the cutting blade 24 to the trailing face 46 of this cutting blade. As indicated, this spiral groove is positioned at a spaced location from the lip 40. This feature is indicated more clearly in FIG. 4 which indicates a spacing 46 between the groove 42 and the lip 40. While the principal portion of the spiral groove is spaced from the lip 40 as illustrated in FIG. 2, the terminal end portion of the groove on the trailing face of the cutting blade terminates on the lip 40 in certain embodiments.

The cross-sectional outline of the spiral groove 42 can assume various geometries. In the illustrated embodiment, the cross-sectional outline is substantially arcuate and allows a portion of the material to be drilled to initially pass through the spiral groove during the drilling operation as the drill is fed into the work piece. This portion of material which passes through the spiral groove is at least partially cut by the subsequent pass of the cutting edge, for example, the cutting edge 30 in FIG. 2 of the further cutting blade 22. Thus, the shavings of the work piece material are cut into thin ribbons, chips or grains that more readily roll out of or move along the length of the flutes of the twist drill during the cutting operation performed by each of the cutting edges of the tip.

In the embodiment illustrated in FIG. 4, a pair of spiral grooves extend from the leading face of each cutting edge at a spaced location from the respective cutting lip 40 and 40' of the cutting edge to the trailing face of the cutting blade tip. The spiral grooves as illustrated in FIG. 4 are spaced at different locations from their respective cutting lip of the cutting tip thereby staggering the grooves to allow material at different depths within the bore being drilled to be passed therethrough. Material passing through the groove is at least partially cut by a subsequent pass of the associated cutting blade.

FIG. 5 illustrates another embodiment of a twist drill constructed in accordance with the present invention in which the leading cutting edge of the twist drill 60 forms a preselected obtuse angle A with the longitudinal axis of the twist drill and the trailing cutting edge 62 forms an obtuse angle B with the longitudinal axis of the cutting edge which is greater than the angle A. In this connection, the cutting edge 60 is the leading cutting edge and contacts material to be cut prior to such material being contacted by the cutting edge 62, the trailing cutting edge.

FIG. 6 illustrates a still further embodiment of the present invention in which the cutting edge 60' and 62' form identical obtuse angles with the longitudinal axis of the twist drill above the line 64. The cutting edge 62' below the line 64' forms a larger obtuse angle with a longitudinal axis of the twist drill. In this connection, inasmuch as the terminal tip portion of the twist drill is symmetric, the drill is less likely to deviate from the axis of the hole yet the trailing edge portion 62' below the line 64 is recessed such that the cutting edge 60' forms the principal or leading cutting edge.

Another feature of the present invention is to provide a twist drill in which the flutes are enlarged in accordance with certain criteria as by removing a portion of the conventional cutting blade proximate the trailing face of each of the blades thereby diminishing the effective width of such blades and increasing the effective cross-sectional area of the flutes. This feature is partially illustrated by the phantom line indicated at 48 in FIG. 2 which would be the counter part to the edge 48' of the trailing face 46 and is illustrated in greater detail in FIG. 7, which will be described in greater detail hereinafter. By shifting the trailing face edge from the location indicated at 48' to the location indicated by 48, and removing the material from the twist drill associated with such shift, the effective size of the flute 50 defined by the trailing face 46 of the cutting blade 24 and the leading face 26 of the cutting blade 22, is increased. Similarly, the size of the flute defined between the trailing face 52 of the flute 22 and the leading face 54 of the flute 24 will be enlarged.

More specifically, a standard flute has a configuration as generally indicated in FIG. 7 at 70. It will be noted by those skilled in the art that the plane of the cut made in a twist drill to define the land and operatively associated flute is made perpendicular to the blade under examination as shown in FIG. 1. From such a frame of reference, this standard flute has a trailing base 72 which terminates trailing edge 73. This trailing wall face 72 has a radius substantially identical to the radius of the leading face 74 which terminates in the leading or cutting edge 75 on the adjacent blade. The radius proximate the bottom 76 of the standard flute 70 is typically less than the radius of the walls 74 and 72 of the leading and trailing edges 75 and 73, respectively.

This standard flute is modified to form a flute 70' as illustrated in FIG. 7 on the 7'—7' side there of proximate the location 78. More specifically, the wall 74' or face on the cutting edge 80 side of the blade is standard, while the wall 72' or face on the trailing edge 82 side of the blade has a larger radius as indicated at R". It will be further noted that the face or wall 72' terminates in the cutting edge 80 and the face or wall 74A terminates in the trailing edge 82. This greater radius R" produces a greater cross-sectional area between the lands 84 and 84'. The greater cross-sectional area allows the chips or shavings flowing through the flute during drilling operations to contact the wall of the work piece allowing the chips to be further broken up. In this manner, less friction is generated since the chips can more freely move along the length of the flute.

In a further embodiment of the invention, a negative radius R1 as indicated in FIG. 7, from the frame of reference in which the radius R" is taken, can be made by rounding off the wall or face of the trailing edge of the flute such that the cross-sectional area of a flute is further enlarged to enhance the efficiency with which the chips contact the wall of the work piece within the hole that is drilled. Alternatively, a portion of the wall or face can include a section having an enlarged radius (R"), that is with respect to the radius R2 of the trailing wall face 72, which terminates in a negative radiused section (R1) that defines the trailing edge. By reducing the friction, heat build up is lessened which has particular advantages in certain orthopedic surgery applications, inasmuch as the drilled bone is not cauterized to the extent that such cauterization would take place in conventional drilling operations.

From the foregoing detailed description, it will be recognized that a twist drill incorporating improvements over known prior art has been described and illustrated. For example, the twist drill of the present invention is designed to reduce heat generated during the drilling operations by providing a modified tip which generates smaller chips or shavings which are removed through the flutes by rotation of the twist drill in a conventional manner. To enhance the movement of the chips through the flutes, the cross-sectional area of the flute is enlarged by altering the radius of the trailing edge of the blade wall such that the cross-sectional area of a flute is increased. This enlarged cross-sectional area enhances the efficiency with which the chips can contact the wall of the work piece into which the twist drill is advanced during drilling operations. Moreover, from testing which has been conducted subsequent to the filing of the parent application, it has been found that the synergistic effect of the modified tip and the modified flute having an enlarged cross-sectional area substantially enhances the efficiency of the drilling operation itself. For example, not only is less heat generated during drilling operations, the drill need not be backed out of the hole as often as is required during conventional drilling. Moreover, as shown in FIG. 7, the flutes are enlarged at a location remote to the drill web. Thus, the effective strength of the drill is not reduced.

Various modifications of the illustrated embodiments could be produced by those skilled in the art without departing substantially from the scope of the invention. Accordingly, the scope of the invention should be considered as being limited only by the attached claims and the equivalents thereof. Moreover, a twist drill with two blades as flutes has been shown; however, additional blade and flutes could be incorporated.

I claim:

1. In a twist drill having a plurality of spiral blades and flutes, each of said blades tapering and terminating in a tip portion defining a cutting edge on the leading face of each of said cutting blades, each of said cutting edges terminating in a cutting lip at the location where said cutting blades taper forming the tip portion, said tip portion defining a substantially triangular cross-sectional outline and having a central web at its apex which joins the tapered leading face and the tapered trailing face of the adjacent annularly spaced blade at the tip portion, the improvement comprising:

at least one spiral groove extending from the leading face of each cutting edge of said tip portion at a spaced location from said cutting lip to the trailing face of cutting blade tip whereby a portion of the material to be drilled initially passes through said spiral groove during the drilling operation as said drill is fed into said material such that said portion of said material passing through said groove is at least partially cut by the subsequent pass of the cutting edge of the further cutting blade tip thereby causing shavings of said material to be broken into small sizes which enhances the travel of the shavings along the length of the flute and assists in reducing binding forces normally applied to said twist drill during drilling operations, and flutes of enlarged cross-sectional area, said flutes being defined between the blade wall face terminating in the leading edge and the blade wall face terminating in the trailing edge of adjacent blades and wherein the radius of the wall defining the leading edge is less than the radius of the wall defining the trailing edge such that the enlarged cross-sectional area of the flutes allows the chips to contact the wall of the material defining the drilled hole and thereby be further broken up into smaller sections.

2. The twist drill of claim 1 wherein the blade wall face terminating in the trailing edge which has a radius greater than the radius of the blade wall face terminating in the leading edge, includes a wall face section terminating in said trailing edge which further is defined by a radius which is negative with respect to the radius of said wall face defined by the elongated radiused section of such wall face.

3. The twist drill of claim 2 wherein said enlarged radiused wall face commences at a spaced location from the central web such that the overall strength of said drill is maintained even though the effective cross-sectional area of the flutes is increased.

4. In a twist drill having a plurality of spiral blades and flutes, each of said blades tapering and terminating in a tip portion defining a cutting edge on the leading face of each of said cutting blades, each of said cutting edges terminating in a cutting lip at the location where said cutting blades taper forming the tip portion, said tip portion defining a substantially triangular cross-sectional outline and having a central web at its apex which joins the tapered leading face and the tapered trailing face of the adjacent annularly spaced blade at the tip portion, the improvement comprising:

at least one spiral groove extending from the leading face of each cutting edge of said tip portion at a spaced location from said cutting lip to the trailing face of cutting blade tip whereby a portion of the material to be drilled initially passes through said spiral groove during the drilling operation as said drill is fed into said material such that said portion of said material passing through said groove is at least partially cut by the subsequent pass of the cutting edge of the further cutting blade tip thereby causing shavings of said material to be broken into small sizes which enhances the travel of the shavings along the length of the flute and assists in reducing binding forces normally applied to said twist drill during drilling operations, and flutes of enlarged cross-sectional area, said flutes being defined between the blade wall face terminating in the leading edge and the blade wall face terminating in the trailing edge of adjacent blades and wherein the radius of the wall defining the leading edge is less than the radius of the wall defining the trailing edge such that the enlarged cross-sectional area of the flutes allows the chips to contact the wall of the material defining the drilled hole and thereby be further broken up into smaller sections, and wherein the portion of the blade wall face terminating in the trailing edge of the adjacent blade defined by the radius having a length greater than the radius defining the wall face terminating in the leading edge of the blade, commences at a spaced location from the central web of the drill such that the overall strength of the drill is maintained even though the effective cross-sectional area of the flutes is increased.

5. The twist drill of claim 4 wherein the blade wall face terminating in the trailing edge which has a radius greater than the blade wall face terminating in the leading edge, includes a wall face section terminating in said trailing edge which further is defined by a radius which is negative with respect to the radius of said wall face defined by the elongated radiused section of such wall face.

* * * * *